(12) United States Patent
Kriegstein

(10) Patent No.: US 9,869,068 B2
(45) Date of Patent: *Jan. 16, 2018

(54) STRUCTURE INCLUDING INTERLOCKING CONTAINERS

(71) Applicant: Warstone Innovations, LLC, Ventura, CA (US)

(72) Inventor: Stewart Kriegstein, Ventura, CA (US)

(73) Assignee: Warstone Innovations, LLC, Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,714

(22) Filed: Nov. 16, 2016

(65) Prior Publication Data
US 2017/0067219 A1    Mar. 9, 2017

Related U.S. Application Data

(63) Continuation of application No. 14/219,062, filed on Mar. 19, 2014, now Pat. No. 9,528,237.

(51) Int. Cl.
| | |
|---|---|
| *E02B 3/12* | (2006.01) |
| *E02B 3/14* | (2006.01) |
| *B65D 21/02* | (2006.01) |
| *E02B 3/04* | (2006.01) |
| *E02B 3/10* | (2006.01) |
| *F41H 5/24* | (2006.01) |
| *E04H 9/14* | (2006.01) |
| *B65D 25/14* | (2006.01) |
| *B65D 43/02* | (2006.01) |
| *B65D 81/18* | (2006.01) |
| *B65D 85/00* | (2006.01) |

(Continued)

(52) U.S. Cl.
CPC ............. *E02B 3/14* (2013.01); *B65D 21/0204* (2013.01); *B65D 21/0209* (2013.01); *B65D 21/0235* (2013.01); *B65D 25/14* (2013.01); *B65D 43/02* (2013.01); *B65D 81/18* (2013.01); *B65D 85/70* (2013.01); *E02B 3/04* (2013.01); *E02B 3/108* (2013.01); *E02D 29/025* (2013.01); *E02D 29/0266* (2013.01); *E04H 9/145* (2013.01); *F41H 5/24* (2013.01); *E04H 3/00* (2013.01)

(58) Field of Classification Search
CPC ................. E02B 3/10; E02B 3/14; E02B 7/02
See application file for complete search history.

(56) References Cited

U.S. PATENT DOCUMENTS

| | | |
|---|---|---|
| 3,490,583 A | 1/1970 | Cook |
| 3,886,751 A | 6/1975 | Porraz Jimenez Labora |
| 4,085,851 A | 4/1978 | Young |

(Continued)

FOREIGN PATENT DOCUMENTS

WO    WO 2011/070335    6/2011

OTHER PUBLICATIONS

PCT International Search Report, International Application No. PCT/US15/20422, dated Jun. 19, 2015, pp. 1-2.

*Primary Examiner* — Beth Stephan

(57) ABSTRACT

A container is disclosed. The container has a side part, an upper part, a lower part, and a cavity formed by the side part, the upper part, and the lower part. The container also has a material disposed in the cavity. The side part has at least one protrusion and at least one recess. The side part is permeable to water. The side part is also nonpermeable to the material disposed in the cavity.

20 Claims, 8 Drawing Sheets

(51) Int. Cl.
*E02D 29/02* (2006.01)
*E04H 3/00* (2006.01)

(56) References Cited

U.S. PATENT DOCUMENTS

| | | | |
|---|---|---|---|
| 4,372,705 A | 2/1983 | Atkinson | |
| 4,449,847 A | 5/1984 | Scales | |
| 4,650,368 A | 3/1987 | Bayer | |
| 5,114,270 A | 5/1992 | Riddle | |
| 5,472,297 A | 12/1995 | Heselden | |
| 5,669,732 A | 9/1997 | Truitt | |
| 5,791,827 A * | 8/1998 | Arvai | E02D 29/025 405/284 |
| 5,848,511 A | 12/1998 | Scales | |
| 6,004,067 A | 12/1999 | Peppard | |
| 6,394,705 B1 | 5/2002 | Lefebvre | |
| 6,428,240 B1 | 8/2002 | Ehrlich et al. | |
| 6,619,884 B2 | 9/2003 | Davis et al. | |
| 6,715,960 B2 | 4/2004 | Metz | |
| 6,955,500 B1 | 10/2005 | Smith | |
| 7,029,200 B1 * | 4/2006 | Cravens | E02B 3/04 405/111 |
| 7,037,037 B1 | 5/2006 | Smith et al. | |
| 7,314,336 B2 | 1/2008 | Moss | |
| 7,329,069 B2 | 2/2008 | Slater et al. | |
| 7,431,534 B2 | 10/2008 | Harbeck | |
| 8,123,435 B1 | 2/2012 | DeShaw et al. | |
| 8,371,772 B2 | 2/2013 | Chang | |
| 8,382,400 B2 | 2/2013 | Powell | |
| 8,678,705 B1 | 3/2014 | Smith | |
| 2003/0161688 A1 | 8/2003 | Frank | |
| 2004/0156680 A1 | 8/2004 | Gibbs | |
| 2006/0275084 A1 | 12/2006 | Harbeck | |
| 2007/0116522 A1 | 5/2007 | Boudreaux, Jr. | |
| 2008/0075535 A1 * | 3/2008 | Han | E02B 3/04 405/16 |
| 2008/0089743 A1 | 4/2008 | Han | |
| 2009/0238648 A1 | 9/2009 | Wilkman | |
| 2010/0150667 A1 | 6/2010 | Phelps | |
| 2010/0186216 A1 * | 7/2010 | Reedijk | E02B 3/108 29/592 |
| 2012/0207545 A1 | 8/2012 | Bouchard et al. | |

* cited by examiner

STRUCTURE INCLUDING INTERLOCKING CONTAINERS

The present application is a continuation of U.S. application Ser. No. 14/219,062 filed on Mar. 19, 2014, which is incorporated herein by reference in its entirety.

TECHNICAL FIELD

The present disclosure is directed to a structure and, more particularly, to a structure including interlocking containers.

BACKGROUND

Structures formed from stackable elements such as sandbag structures are used in a wide variety of applications. Such structures may be used for erosion control at locations such as areas located near large bodies of water that are subject to flooding.

One patent that describes such structures is U.S. Pat. No. 3,886,751 (the '751 patent) to Porraz Jimenez Labora, issued on Jun. 3, 1975. The '751 patent discloses a wall structure including a plurality of collapsible bags constructed of polyester, polypropylene, polyethylene, or similar materials. The bags of the '751 patent are filled with an aggregate such as gravel. The bags include a plurality of protuberances and indentations for interlocking the bags.

However, the structure of the '751 patent does not appear to possess significant lateral resistance to external forces. The bags of the '751 patent appear to be made of nonporous material that does not allow the flow of liquid such as water into the material contained in the bag to increase lateral resistance. Also, the bags disclosed in the '751 patent apparently do not provide for significant frictional resistance between the bags to increase lateral resistance.

The present disclosure is directed to overcoming one or more of the shortcomings set forth above.

SUMMARY OF THE DISCLOSURE

In one aspect, the present disclosure is directed to a container. The container includes a side part, an upper part, a lower part, and a cavity formed by the side part, the upper part, and the lower part. The container also includes a material disposed in the cavity. The side part includes at least one protrusion and at least one recess. The side part is permeable to water. The side part is also nonpermeable to the material disposed in the cavity.

In another aspect, the present disclosure is directed toward a method. The method includes providing a first container including a side part and a cavity, the side part of the first container including a protrusion, and retaining a material in the cavity of the first container. The method also includes providing a second container including a recess, inserting the protrusion of the first container into the recess of the second container, and passing a fluid through the side part of the first container and into the cavity of the first container.

DETAILED DESCRIPTION

Figure 1:
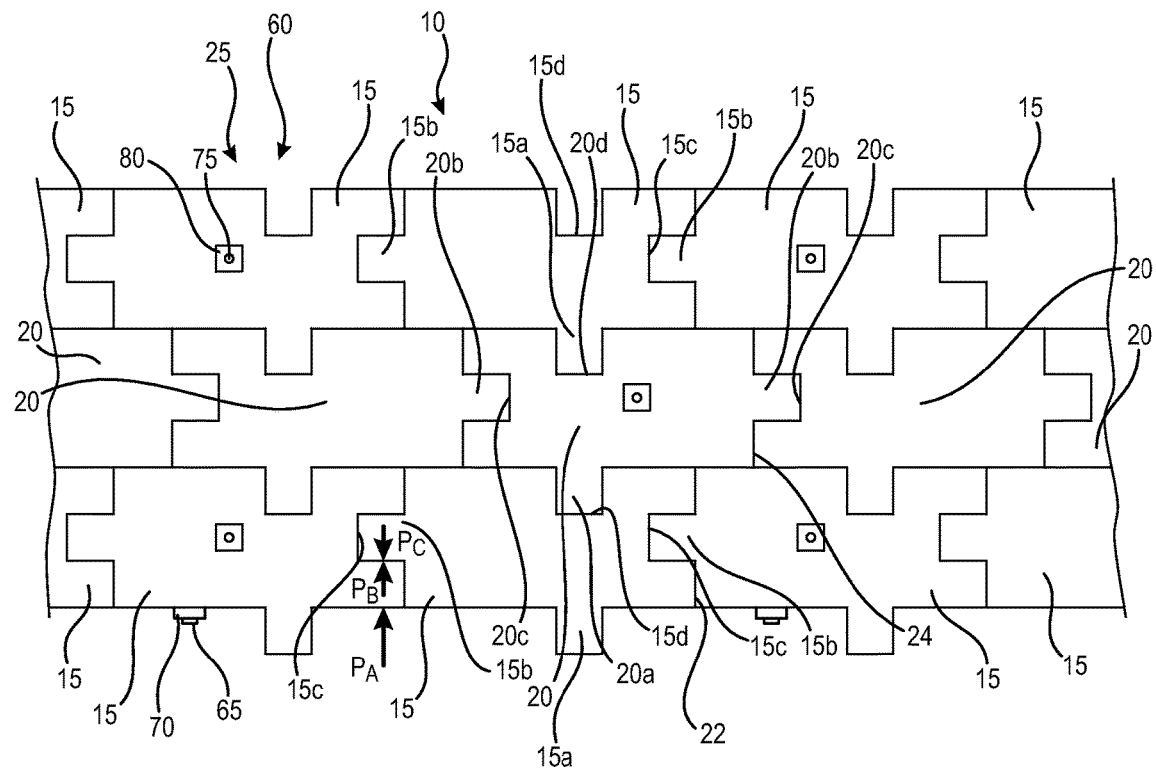
FIG. 1 is a plan view of an exemplary structure.
Figure 2:
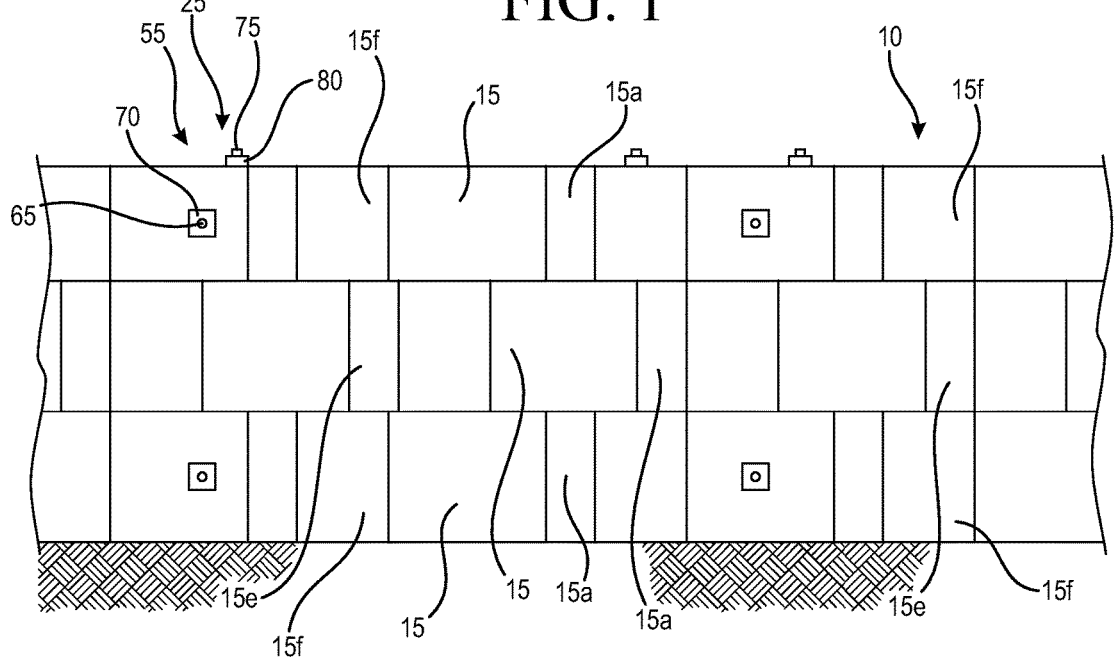
FIG. 2 is an elevation view of the exemplary structure.

FIGS. 1 and 2 illustrate an exemplary structure 10. Structure 10 may include a plurality of containers (e.g., containers 15 and containers 20). As described below, some exemplary embodiments of structure 10 may also include a fastening system 25 that may help to fasten the plurality of containers of structure 10 together.

The plurality of containers (e.g., containers 15 and containers 20) may be interlocking containers that interlock together to form structure 10. For example, each container 15 may include a protrusion 15a, a protrusion 15b, a recess 15c, and a recess 15d. Also, for example, each container 20 may include a protrusion 20a, a protrusion 20b, a recess 20c, and a recess 20d. A plurality of containers 15 and containers 20 may interlock together via protrusions and recesses that are configured to fit into each other. For example, as illustrated in FIG. 1, protrusion 15a of a given container 15 may be received by recess 20d of a given container 20, protrusion 15b of a given container 15 may be received by recess 15c of a given container 15, protrusion 20a of a given container 20 may be received by recess 15d of a given container 15, and protrusion 20b of a given container 20 may be received by recess 20c of a given container 20. A plurality of containers 15 and 20 may thereby interlock together to form structure 10, as illustrated in FIG. 1. It is also contemplated that some or all containers of structure 10 may not have protrusions and/or recesses.

Containers 15 and 20 may be, for example, mirror images of each other, and may be arranged in alternating rows, as illustrated in FIG. 1. For example, containers 15 and 20 may be arranged in a pattern. For example, alternating rows of containers 15 and 20 may be arranged so that seams 22 and 24 between adjacent containers are staggered between rows, as illustrated in FIG. 1. Also, for example, containers 15 may be substantially similar in shape to each other, and containers 20 may be substantially similar in shape to each other, with containers 15 being shapes that are mirror images of containers 20, as illustrated in FIG. 1. The plurality of containers of structure 10 may also be any other suitable shape and may be different from each other, as described, for example, below in other exemplary embodiments of structure 10.

Layers of interlocking containers 15 and 20 may be stacked on top of each other, as illustrated in FIG. 2. The stacked layers of interlocking containers may also be staggered in plan between stacked layers. For example, as illustrated in FIG. 2, central portions 15e of containers 15 of a given interlocking layer of containers may be aligned with end portions 15f of containers 15 of interlocking layers disposed above and/or below the given interlocking layer. Similarly, central portions of containers 20 of a given interlocking layer of containers may be aligned with end portions of containers 20 of interlocking layers disposed above and/or below the given interlocking layer. The interlocking layers may be staggered in any other suitable manner such as, for example, given portions of containers 15 of a given interlocking layer being aligned with given portions of containers 20 of interlocking layers disposed above and/or below the given interlocking layer. Structure 10 may include any suitable number of stacked interlocking layers such as, for example, up to five stacked layers, up to ten stacked layers, or up to several dozens of stacked layers. It is also contemplated that structure 10 may include a single layer of interlocking containers.

Figure 3:
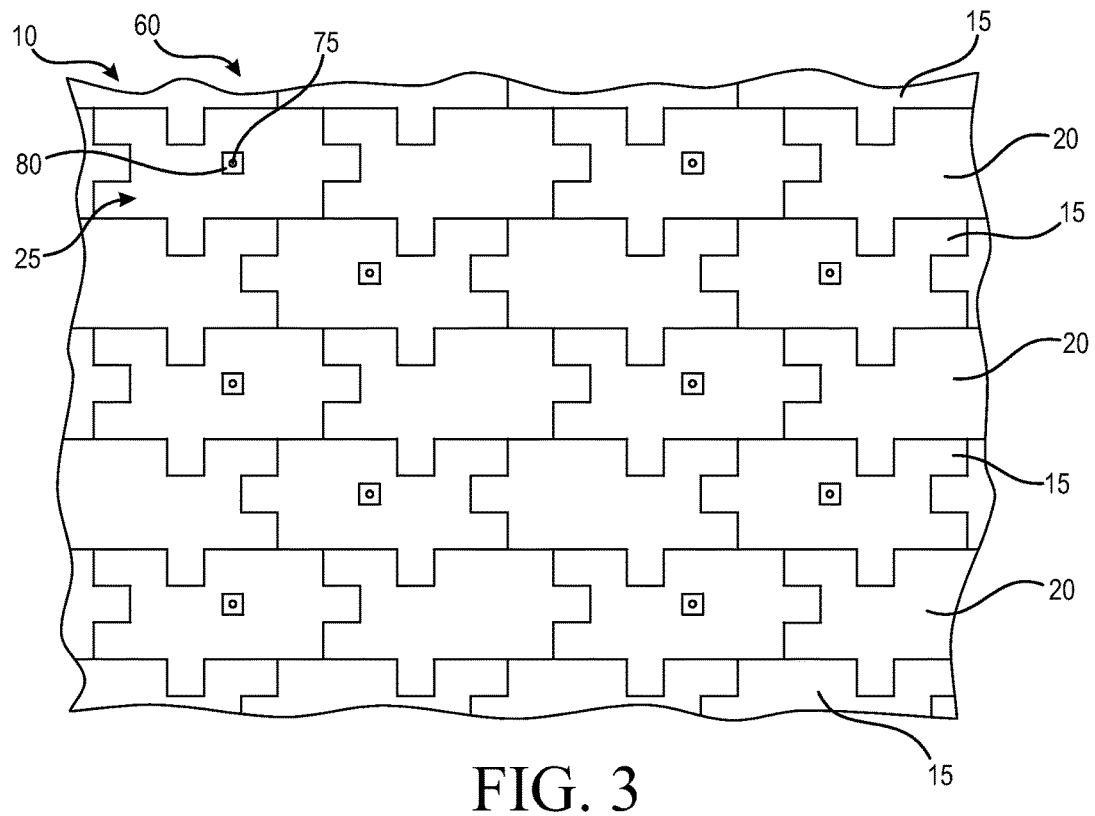
FIG. 3 is a plan view of a second exemplary structure.

Any suitable number of containers 15 and containers 20 may be interlocked together to form structure 10. For example, as illustrated in FIG. 3, each given layer of interlocking containers may include numerous containers, and may extend up to any suitable size in length and/or width. For example, stacked layers of structure 10 may extend from a few feet in length to over one hundred feet in length, up to several hundred feet in length, or may extend miles in length. Similarly, structure 10 may be any suitable width such as, for example, a few feet in width, up to ten feet in width, or up to several hundred feet in width. It is also contemplated that structure 10 may extend continuously in both length and width over a large geographic area. For example, structure 10 may act as a protective blanket against surface erosion over a given area.

Figure 4:
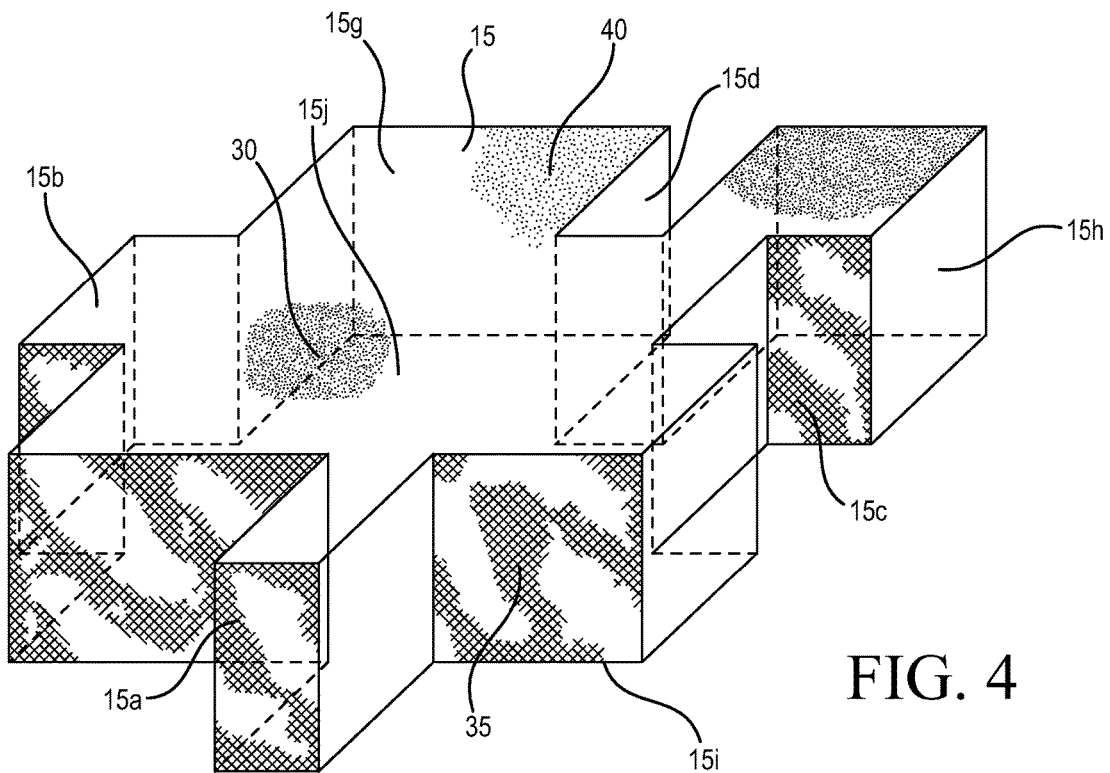
FIG. 4 is a schematic illustration of an exemplary container.

The plurality containers of structure 10 may include suitable containers for retaining a material. For example, as illustrated in FIG. 4, container 15 may include an upper part 15$g$, a side part 15$h$, and a lower part 15$i$. A cavity 15$j$ may be formed by upper part 15$g$, side part 15$h$, and lower part 15$i$. Upper part 15$g$, side part 15$h$, and/or lower part 15$i$ may be parts of an integral container or may be separate parts that are attached to each other by any suitable method in the art. For example, upper part 15$g$, side part 15$h$, and/or lower part 15$i$ may be attached together by stitching, sewing, adhesive, and/or mechanical fasteners. Some portions of upper part 15$g$, side part 15$h$, and/or lower part 15$i$ may be attached together and some portions of upper part 15$g$, side part 15$h$, and/or lower part 15$i$ may be integral with each other. Upper part 15$g$, side part 15$h$, and lower part 15$i$ may form cavity 15$j$ that may be filled with suitable material as described below. Upper part 15$g$, side part 15$h$, and lower part 15$i$ may be shaped to form protrusion 15$a$, protrusion 15$b$, recess 15$c$, and/or recess 15$d$.

Container 15 may have any suitable dimensions for interlocking to form structure 10. For example, container 15 may have relative width-to-length-to-depth dimensions of about 3:6:2. Also, container 15 may have any other suitable relative width-to-length-to-depth dimensions such as, for example, a width of between about 2 and about 10 given units, a length of between about 2 and about 10 given units, and a depth of between about 1 and about 10 given units. For example, container 15 may be between about 6 inches and about 5 feet in width, between about 6 inches and about 5 feet in length, and between about 3 inches and about 5 feet in depth. It is also contemplated that container 15 may have width, length, and/or depth dimensions of between about an inch and about twenty or more feet. Container 15 may be any suitable shape such as, for example, a substantially rectangular shape, a substantially square shape, a substantially pyramid-like shape, and an irregular polygon shape having any suitable number of faces. Container 15 may be a flexible container for retaining material such as, for example, a bag. It is also contemplated that container 15 may be a relatively stiff container having some, little, or substantially no flexibility.

Side part 15$h$ may include one integral part or a plurality of parts that are attached to upper part 15$g$ and/or lower part 15$i$, or may be partially or fully integral with upper part 15$g$ and/or lower part 15$i$. Side part 15$h$ may be shaped to form protrusion 15$a$, protrusion 15$b$, recess 15$c$, and recess 15$d$.

Side part 15$h$ may be formed from any suitable material for containing material. For example, side part 15$h$ may be formed from a material that is both permeable to a fluid and nonpermeable to a material 30 (described below) that may be contained in container 15 or container 20. For example, side part 15$h$ may be formed from a material that is both permeable to water and nonpermeable to material 30. Side part 15$h$ may be formed from, for example, a woven fabric. Side part 15$h$ may be, for example, nylon fabric. Also, for example, side part 15$h$ may be formed from any permeable textile that is permeable to water and nonpermeable to material 30. Further, for example, side part 15$h$ may be formed from a synthetic mesh material such as, for example, plastic mesh or wire mesh that is permeable to a fluid and nonpermeable to material 30, described below. For example, side part 15$h$ may be formed from a flexible, finely meshed plastic and/or finely meshed metal material. Also, for example, side part 15$h$ may be formed from any suitable nonpermeable material having fine perforations that allow the flow of liquid such as water and that do not allow the passage of relatively coarser material such as, for example, material 30. For example, side part 15$h$ may be formed from perforated wood, perforated sheet metal, perforated plastic, and/or perforated polymeric material. Some or substantially all of side part 15$h$ may include material that is permeable to liquid such as water and nonpermeable to material 30. Side part 15$h$ may also be formed from substantially nonpermeable material. For example, side part 15$h$ may be formed from one or more ballistic materials. For example, side part 15$h$ may be formed from carbon fiber composite material, para-aramid synthetic fiber (e.g., Kevlar®), metals such as steel or titanium, and/or polycarbonate. Upper part 15$g$ and lower part 15$i$ may be formed from material that is similar to the material of side part 15$h$. When side part 15$h$ is formed from a permeable material, upper part 15$g$ and/or lower part 15$i$ may be formed from nonpermeable material. When side part 15$h$ is formed from a nonpermeable material, upper part 15$g$ and/or lower part 15$i$ may be formed from permeable material. Also, side part 15$h$, upper part 15$g$, and lower part 15$i$ may all be formed from permeable material. Further, side part 15$h$, upper part 15$g$, and lower part 15$i$ may all be formed from nonpermeable material.

Figure 5:
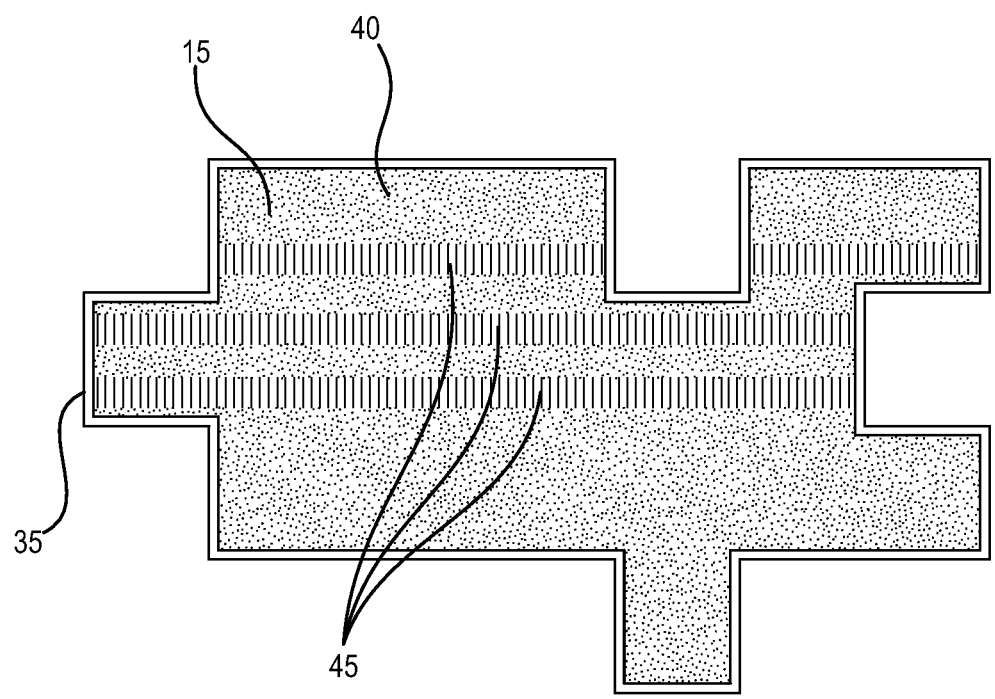
FIG. 5 is a plan view of the exemplary container.
Figure 6:
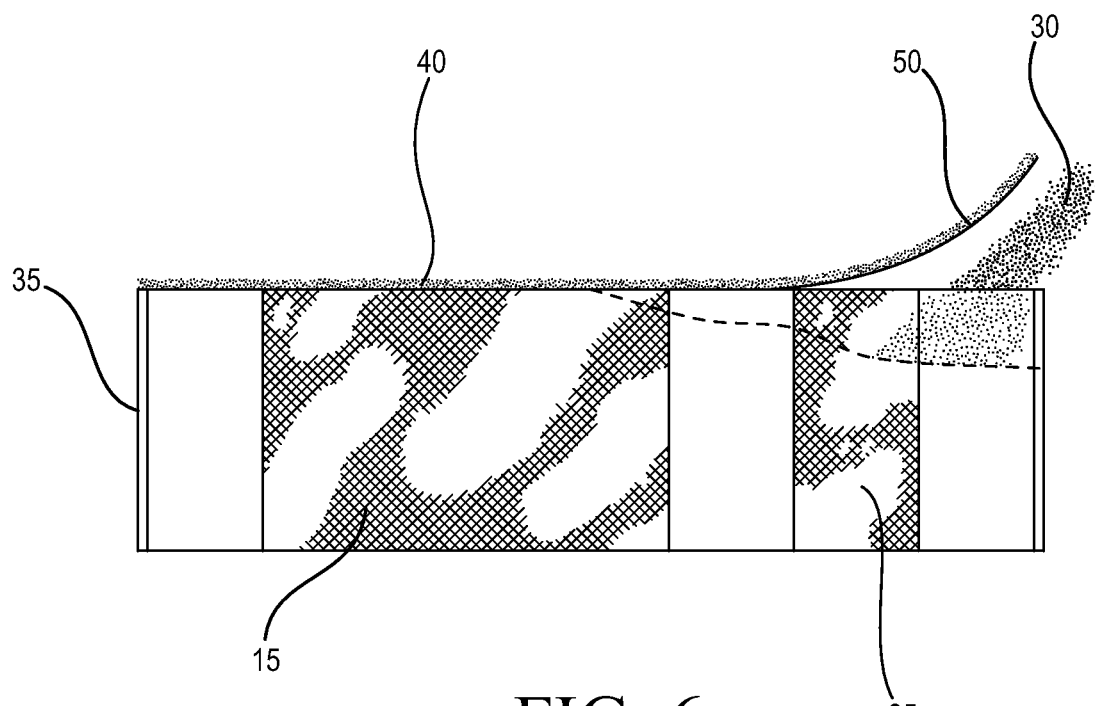
FIG. 6 is an elevation view of the exemplary container.

A cover 35 may be disposed on side part 15$h$, as illustrated in FIGS. 4-6. Cover 35 may also be disposed on upper part 15$g$ and/or lower part 15$i$. Cover 35 may be a single cover that covers substantially all of side part 15$h$ or a single cover that covers some of side part 15$h$. Alternatively, a plurality of covers 35 may cover some or substantially all of side part 15$h$. One or more covers 35 may also cover portions of upper part 15$g$ and/or lower part 15$i$ or substantially all of upper part 15$g$ and/or lower part 15$i$. Cover 35 may be a removable cover that may be removably attached to container 15. Cover 35 may be removably attached to side part 15$h$ by any suitable method in the art such as, for example, stitching, sewing, adhesive, and/or mechanical fasteners. For example, cover 35 may be removably attached by stitching, sewing, adhesion, and/or mechanical fastening to side part 15$h$ at the same time that portions of side part 15$h$, upper part 15$g$, and/or lower part 15$i$ may be attached together. It is also contemplated that cover 35 may be removably attached by stitching, sewing, adhesion, and/or mechanical fastening to any portion of container 15. Because cover 35 may be removably attachable to container 15, it may be removed at any suitable time before, during, or after an installation of structure 10. For example, cover 35 may be ripped away from container 15 at any suitable time before, during, or after an installation of structure 10.

Cover 35 may be formed from any suitable nonpermeable material. Cover 35 may be formed from a nonpermeable that may seal side part 15h and substantially prevent liquid from passing through side part 15h. For example, cover 35 may substantially prevent premature saturation and/or hydration of material 30 by liquid such as water. Cover 35 may be formed from material such as, for example, polyvinyl. For example, cover 35 may be a polyvinyl sheet or strip that is removably attached to side part 15h. Cover 35 may also be formed from one or more materials such as, for example, non-permeable plastic, non-permeable natural material such as rubber or wood, non-permeable synthetic material such as elastomeric material, polymeric material, metallic material such as flexible sheet metal, and/or composite material. For example, cover 35 may be formed from one or more materials such as, for example, poly(vinyl chloride), polyethylene, and/or polypropylene. For example, cover 35 may include any suitable material that is substantially nonpermeable to water such as, for example, plastic, composite material, metal, foam, and/or wood. For example, cover 35 may be a thin polyvinyl sheet.

Upper part 15g and/or lower part 15i may include a coating 40, as illustrated in FIGS. 4-6. Coating 40 may be disposed on exterior surfaces of upper part 15g and/or lower part 15i so that they are disposed on an exterior of container 15. Coating 40 may be disposed on some or substantially all of upper part 15g and/or lower part 15i. It is also contemplated that coating 40 may be disposed on any exterior or interior surfaces of container 15. Any suitable amount of coating 40 may be disposed on container 15 at a constant or variable thickness. For example, coating 40 may be applied in a thin coating, a coating of between about ⅛" and about 1", or at a thickness of several inches. A thickness of coating 40 may be substantially constant across the surfaces of container 15, may vary across surfaces of container 15, or may have portions of substantially constant thickness and portions of variable thickness.

Coating 40 may be formed from any suitable material that increases a coefficient of friction between surfaces of stacked layers of containers 15. For example, coating 40 may be a material that increases frictional resistance between upper part 15g of a first container 15 and lower part 15i of a second container 15 stacked on top of first container 15, and that increases frictional resistance between lower part 15i of second container 15 and upper part 15g of a third container 15 stacked below second container 15. Coating 40 may thereby increase the lateral resistance of structure 10 by increasing frictional resistance between stacked containers 15. Coating 15 may be formed from any suitable material for increasing a coefficient of friction between surfaces such as, for example, a rubberized coating. Coating 40 may include material such as, for example, rubber, elastomers, crushed rock, sand, glass, plastic, metal, asphalt, and/or adhesives. For example, coating 40 may be a mixture including some or all of the above material for increasing a coefficient of friction. For example, coating 40 may be a rubberized material including granular material such as sand. For example, coating 40 may be a material having a static friction coefficient ($\mu_s$) between stacked surfaces coated with coating 40 of between about 0.4 and about 1.4. For example, coating 40 may be a rubberized material having a static friction coefficient ($\mu_s$) between stacked surfaces coated with coating 40 of between about 0.9 and about 1.3, or between about 1.1 and about 1.2. Coating 40 may be an nonpermeable coating that substantially blocks a flow of liquid such as water through upper part 15g and/or lower part 15i. It is also contemplated that coating 40 may be a permeable coating. It is also contemplated that side part 15h may be coated with coating 40.

Figure 15:
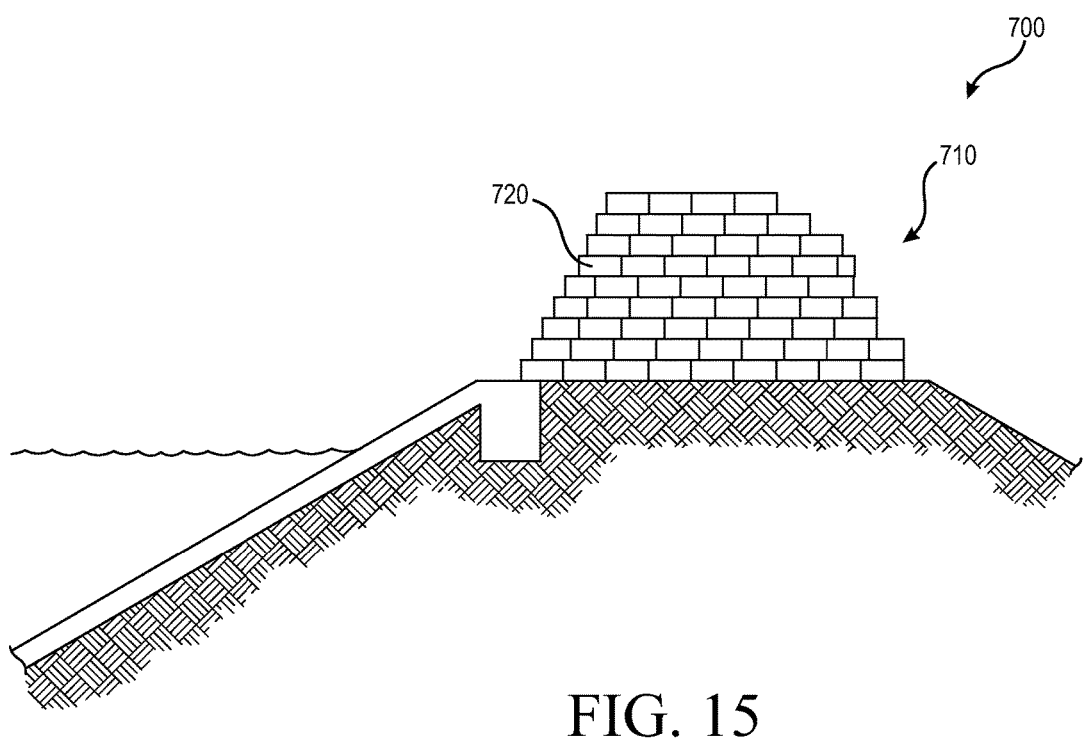
FIG. 15 is a sectional view of a second exemplary erosion control system.

Upper part 15g and/or lower part 15i may include a coating 45, as illustrated in FIG. 5. Coating 45 may be any suitable material for marking a surface of upper part 15g and/or lower part 15i. For example, coating 45 may be a material suitable for making marks to facilitate the staggered placement of containers 15 between layers. Coating 45 may be any suitable marking material such as, for example, paint, colored coatings, colored mixtures, staining material, and/or any suitable chemicals causing a change in color. Coating 45 may be any suitable thickness such as, for example, a thin coating having a thickness of a fraction of an inch. For example, coating 45 may be a thin paint coating applied to an exterior surface of upper part 15g and/or lower part 15i. It is also contemplated that coating 45 may be applied to side part 15h. A shape of coating 45 may substantially correspond to a shape of an outline in plan of a portion of container 15. For example, a shape of coating 45 may be a substantially straight line that corresponds to a shape of a second container 15 stacked in a staggered arrangement (e.g., in plan) on top of first container 15. For example, coatings 45 may form a plurality of substantially parallel lines. As described below, coating 45 may facilitate a stepped arrangement of structure 10 (e.g., as illustrated in FIG. 15 and as discussed below). As described further below, an interval between coatings 45 and/or a color of coatings 45 may vary depending on a desired stepped arrangement. Some or all containers 15 may include coatings 45 to facilitate staggered stacking of levels of containers 15 to form structure 10.

Material 30 may be disposed and retained in cavity 15j of container 15. Material 30 may be any suitable material for filling container 15. For example, material 30 may be a material that may not permeate or pass through side part 15h. Also, for example, material 30 may be a solid material and/or a mixed material. Further, for example, material 30 may also be a fluid that may not permeate through side part 15h. Additionally, for example, material 30 may be a mixed cementitious material such as, for example, mixed concrete. For example, material 30 may be a field mixed concrete or a ready mixed concrete. Also, for example, material 30 may also be a non-mixing cementitious material such as, for example, non-mixing concrete. For example, material 30 may be a designed dry cementitious mix. Further, for example, material 30 may be a dry material. Additionally, for example, material 30 may also be a mixed cementitious material including water. Also, for example, material 30 may be clay, soil, organic material, and/or nonorganic fill. Further, for example, material 30 may be any suitable granular material such as crushed rock, sand, and/or gravel. Additionally, for example, material 30 may include binder such as, for example, cement such as Portland cement, and aggregates such as, for example, sand and/or rock. The binder may be a rapid setting cement binder. Also, for example, material 30 may further include admixtures that improve the characteristics of a mix such as, for example, plasticizers, accelerating concrete admixtures, water-reducing admixtures, shrinkage reducing admixtures, set retarding admixtures, and/or admixtures for air entrainment. Further, for example, material 30 may also include volume-increasing admixtures. Additionally, for example, material 30 may include plastic, composite material, metal, foam, and/or wood material.

Material 30 may also, for example, include an absorbing material that may be substantially fully incorporated throughout material 30. The absorbing material may include a super-absorbent material that absorbs a greater amount of fluid than coarse or fine aggregate material used in cementitious materials such as concrete. For example, the absorbing material may include a super-absorbent material that may absorb a greater amount of fluid than a coarse aggregate for concrete (e.g., coarse aggregate such as gravel and/or crushed stone having a diameter, for example, of between about ⅜" and about 1½") or a fine aggregate for concrete (e.g., fine aggregate such as sand and/or crushed stone having a diameter, for example, small enough to pass through a ⅜" sieve). Thus, the absorbing material may include a super-absorbent material that is more absorbent than coarse or fine aggregate material used in cementitious materials such as, for example, a coarse aggregate for concrete or a fine aggregate for concrete. For example, the absorbing material may include a super-absorbent material that is a plurality of fibers. For example, the absorbing material may include a super-absorbent material that is a plurality of micro fibers. The plurality of micro fibers may be super-absorbing micro fibers. The absorbing material may include a super-absorbent material that is a tubular material for absorbing a fluid. For example, the absorbing material may include a super-absorbent material that is a plurality of tubular-shaped fibers. The absorbing material may include a super-absorbent material that is natural and/or synthetic absorbent material. For example, the absorbing material may include a super-absorbent material that is a natural and/or synthetic fiber. The absorbing material may include a super-absorbent material that is a fiber material such as, for example, cellulose fibers, cotton, and/or paper. The absorbing material may include a super-absorbent material that is a nano structure for absorbing a fluid such as, for example, nanotubes. The absorbing material may include a super-absorbent material that is any suitable micro-size material for absorbing water in a cementitious composition.

Material 30 may be disposed in cavity 15*j* of container 15 through any suitable method in the art. For example, an unattached portion 50 of container 15 may be opened to allow material 30 to be inserted into cavity 15*j* of container 15. Also, for example, material 30 may be placed into cavity 15*j* of container 15 prior to upper part 15*g* being attached to side part 15*h*. It is also contemplated that material 30 may be pumped into cavity 15*j* of container 15 under pressure and/or that material 30 be placed into cavity 15*j* of container 15 during a fabrication of container 15.

Container 20 may be formed similarly to container 15, and may include substantially all of the same features described above in relation to container 15. For example, both containers 15 and containers 20 may be interlocked and stacked with each other using the features disclosed above.

Fastening system 25 may include a horizontal fastening subsystem 55 and a vertical fastening subsystem 60. Horizontal fastening subsystem 55 may fasten containers together in a horizontal direction, and vertical fastening subsystem 60 may fasten containers together in a vertical direction.

As illustrated in FIGS. 2 and 7-9, horizontal fastening subsystem 55 may include a plurality of fastening elements 65 and 70. Fastening elements 65 may be any suitable element for fastening together containers such as, for example, metal, plastic, fiber, or wooden elements. For example, fastening elements 65 may be elongated metal rods, metal cable, wire rope, steel rebar, and/or post-tensioning steel rods. Also, for example, fastening elements 65 may be rope made of fiber, elongated plastic elements, elements made from polymer, elongated wooden elements such as wooden dowels, and/or flexible material such as elastomeric material or rubber material. For example, fastening elements 65 may be elongated substantially horizontal elements that horizontally fasten adjacent containers of structure 10. Fastening elements 65 may be attached to the exemplary disclosed containers by any suitable methods such as, for example, fastening elements 70. Fastening elements 70 may be formed from one or more of the materials disclosed above in relation to fastening element 65. Fastening elements 70 may be any suitable element for attaching fastening elements 65 to the exemplary disclosed containers such as, for example, a plate through which fastening element 65 may be threaded, and/or an element attached to the exemplary disclosed containers (e.g., by mechanical attachment, adhesion, stitching, and/or sewing) to which element 65 may be attached. Fastening elements 65 may also be directly attached to the exemplary disclosed containers through any suitable method such as, for example, mechanical attachment, adhesion, stitching, and/or sewing. Fastening elements 65 may also make a connection to the exemplary disclosed containers by frictional forces produced between material 30 disposed in the exemplary disclosed containers. For example, fastening elements 65 may extend substantially entirely through a width and/or length of the exemplary disclosed structure, and may be fastened by fastening elements 70 at exterior surfaces of the exemplary disclosed structure. Fastening elements 65 and 70 may thereby work together to produce tensile forces to pull together the exemplary disclosed containers in a horizontal direction. As illustrated in FIGS. 2 and 7-9, fastening elements 65 may be disposed in multiple horizontal directions to exert tensile forces in multiple directions to pull together the exemplary disclosed containers.

As illustrated in FIGS. 2, 3, and 7-9, vertical fastening subsystem 60 may include a plurality of fastening elements 75 and 80. Fastening elements 75 may be any suitable element for pulling and/or fastening together containers such as, for example, metal, plastic, fiber, or wooden elements. For example, fastening elements 75 may be elongated metal rods such as, for example, steel rebar and/or post-tensioning steel rods. Also, for example, fastening elements 75 may be elongated plastic elements, elongated wooden elements such as wooden dowels, and/or polymeric elements. Fastening elements 75 may be attached to the exemplary disclosed containers similarly to fastening elements 65, and fastening elements 80 may be similar to fastening elements 70. For example, fastening elements 75 may extend substantially entirely through a height of the exemplary disclosed structure, and may be fastened by fastening elements 80 at exterior surfaces of the exemplary disclosed structure. Fastening elements 75 may be driven through a portion of soil or other material on which the exemplary disclosed structure is constructed. Fastening elements 75 and 80 may thereby work together to produce forces to pull together the exemplary disclosed containers in a vertical direction, and thereby pin the exemplary disclosed containers to the soil or other material on which the exemplary disclosed structure is constructed. For example, fastening element 75 may be an elongated element that vertically pins an exemplary disclosed container to a material supporting that container. It is also contemplated that fasteners 80 may be attached at both ends of fastener 75, and tensile forces may be exerted vertically to pull the exemplary disclosed containers together in a vertical direction, similar to fastening elements 65 and 70 in the horizontal direction, described above.

Fastening elements 65 and 75 may be inserted through the exemplary disclosed containers through any suitable method. For example, fastening elements 65 and 75 may be inserted through apertures provided in the exemplary disclosed containers and/or may be pushed or poked through the exemplary disclosed containers.

It is also contemplated that structure 10 may not include fastening system 25. In an exemplary structure in which structure 10 does not include fastening system 25, for example, containers of structure 10 may be held in place substantially entirely through frictional forces and gravity (e.g., through the weight of containers being stacked on each other).

Figure 7:
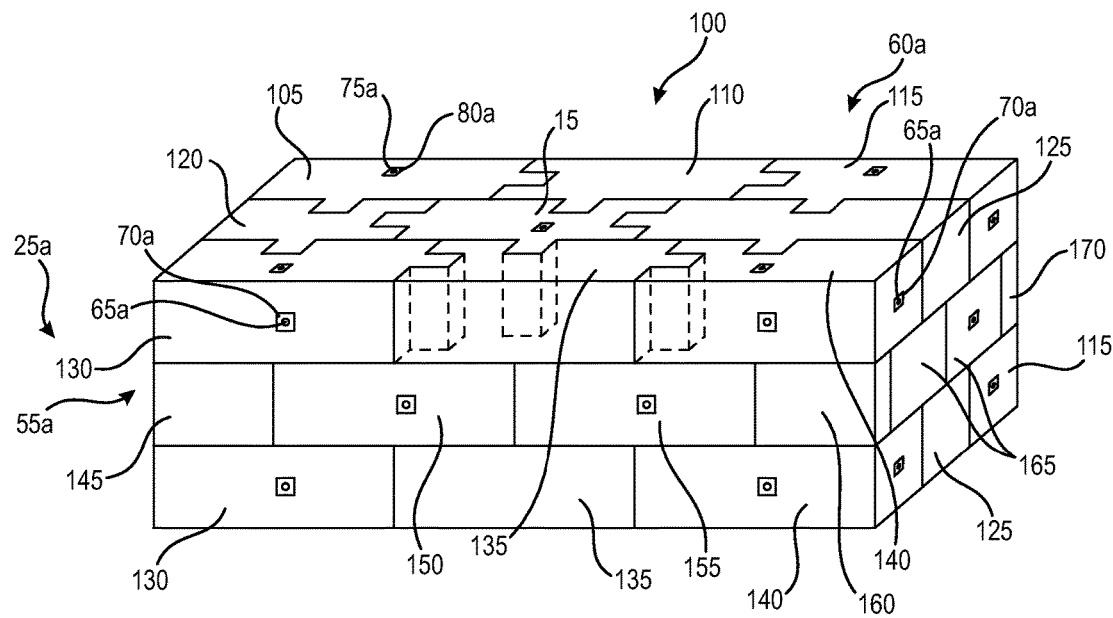
FIG. 7 is a perspective view of a third exemplary structure.
Figure 8:
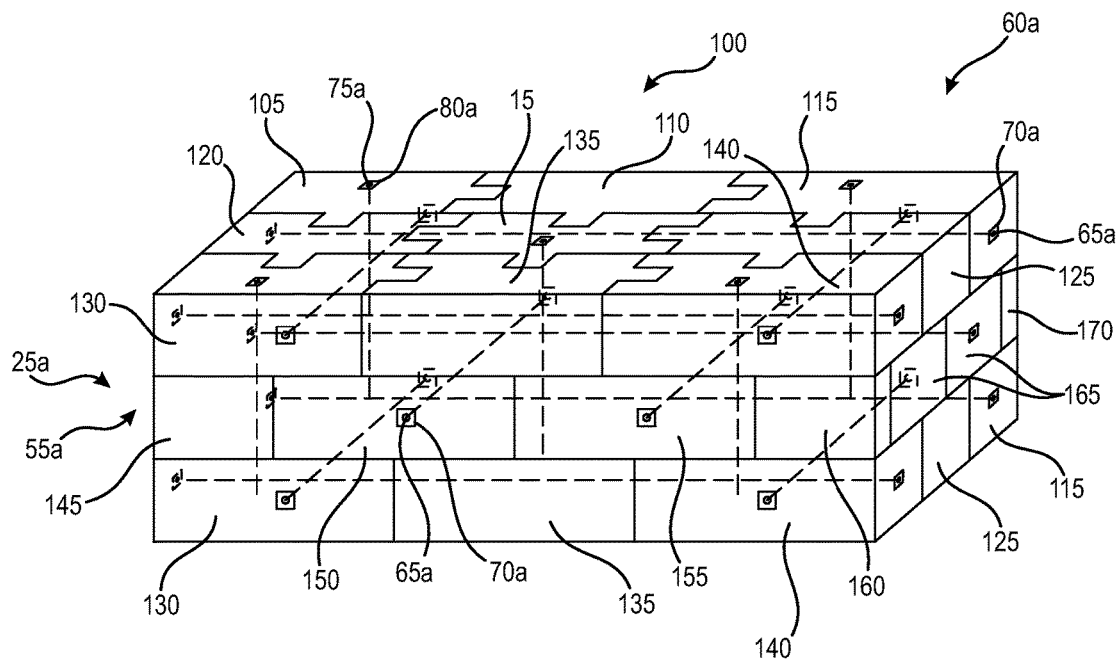
FIG. 8 is a perspective view of the third exemplary structure.
Figure 9:
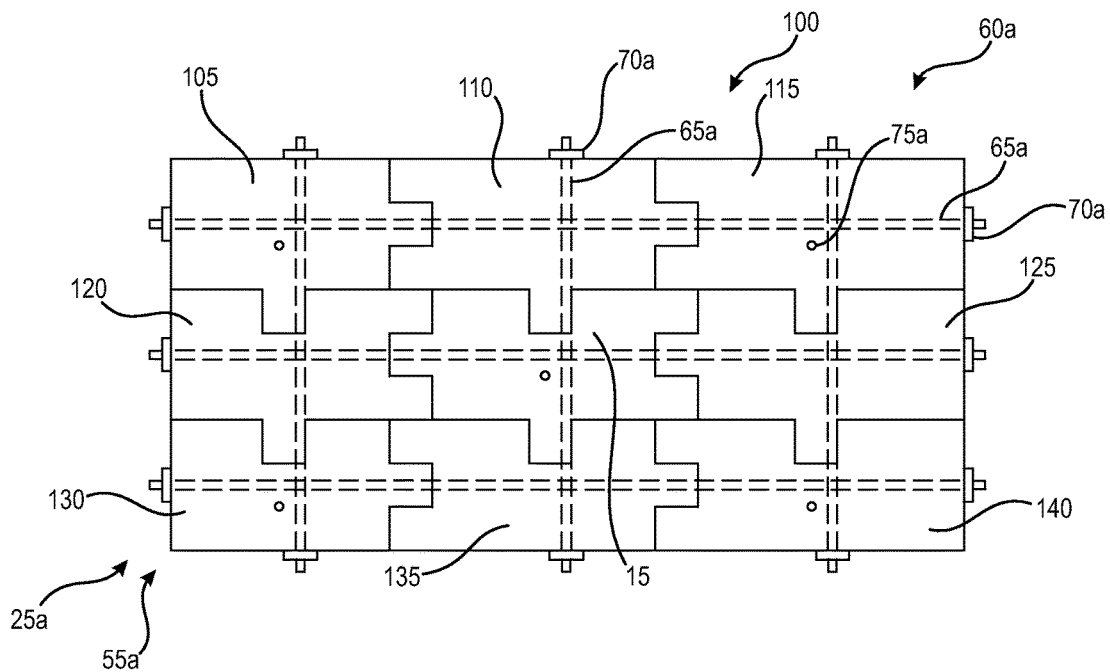
FIG. 9 is a plan view of the third exemplary structure.

FIGS. 7-9 illustrate a structure 100, an alternative embodiment of the exemplary disclosed structure. Structure 100 may include a plurality of containers that may be similar to containers 15 and 20, disclosed above, and a fastening system 25a (e.g., including a horizontal fastening subsystem 55a, a vertical fastening subsystem 60a, fastening elements 65a, fastening elements 70a, fastening elements 75a, and fastening elements 80a) that is similar to fastening system 25, disclosed above. For example, as illustrated in FIGS. 7-9, structure 100 may include one (or more) container 15, a container 105, a container 110, a container 115, a container 120, a container 125, a container 130, a container 135, a container 140, a container 145, a container 150, a container 155, a container 160, a container 165, and a container 170. Accordingly, structure 100 may contain a significant number of differently shaped containers having various shapes and having the interlocking arrangement illustrated in FIGS. 7-9.

Figure 10:
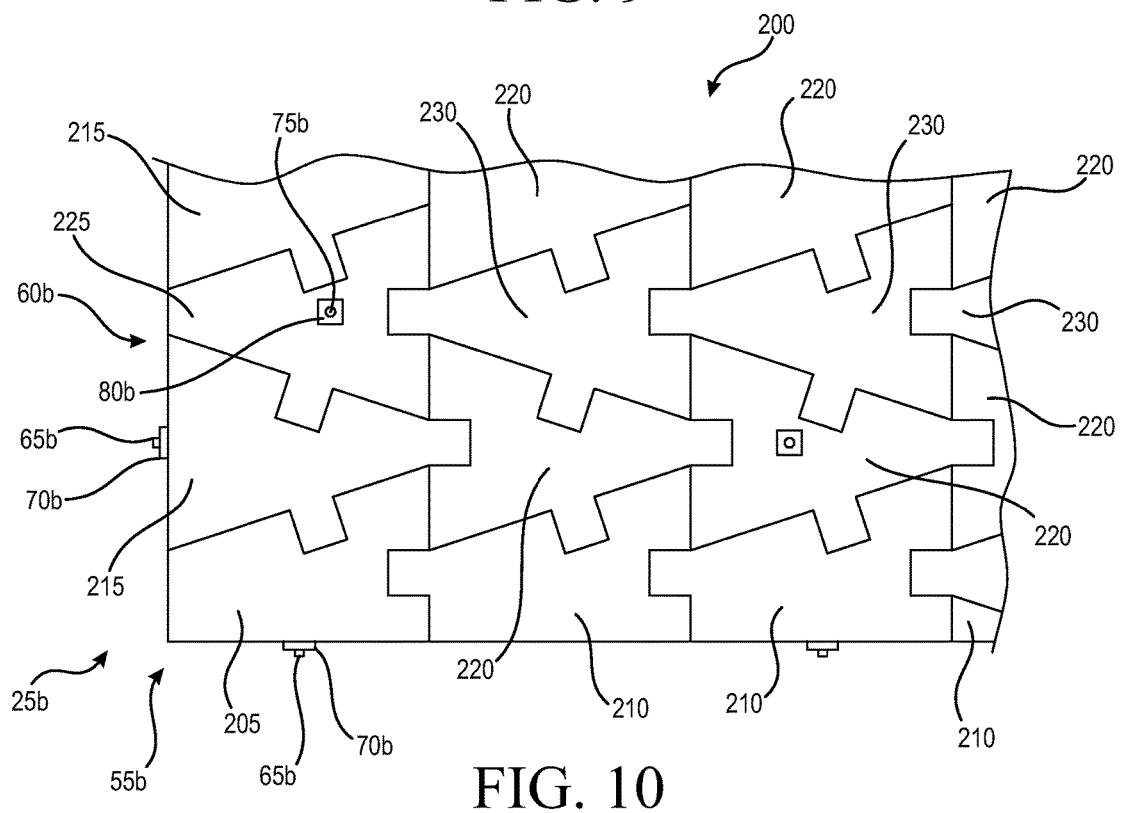
FIG. 10 is a plan view of a fourth exemplary structure.

FIG. 10 illustrates a structure 200, an alternative embodiment of the exemplary disclosed structure. Structure 200 may include a plurality of containers that may be similar to containers 15 and 20, disclosed above, and a fastening system 25b (e.g., including a horizontal fastening subsystem 55b, a vertical fastening subsystem 60b, fastening elements 65b, fastening elements 70b, fastening elements 75b, and fastening elements 80b) that is similar to fastening system 25, disclosed above. For example, as illustrated in FIG. 10, structure 200 may include a container 205, a plurality of containers 210, a plurality of containers 215, a plurality of containers 220, a container 225, and a plurality of containers 230. Accordingly, structure 200 may contain a number of differently shaped containers having various shapes and having the interlocking arrangement illustrated in FIG. 10.

Figure 11:
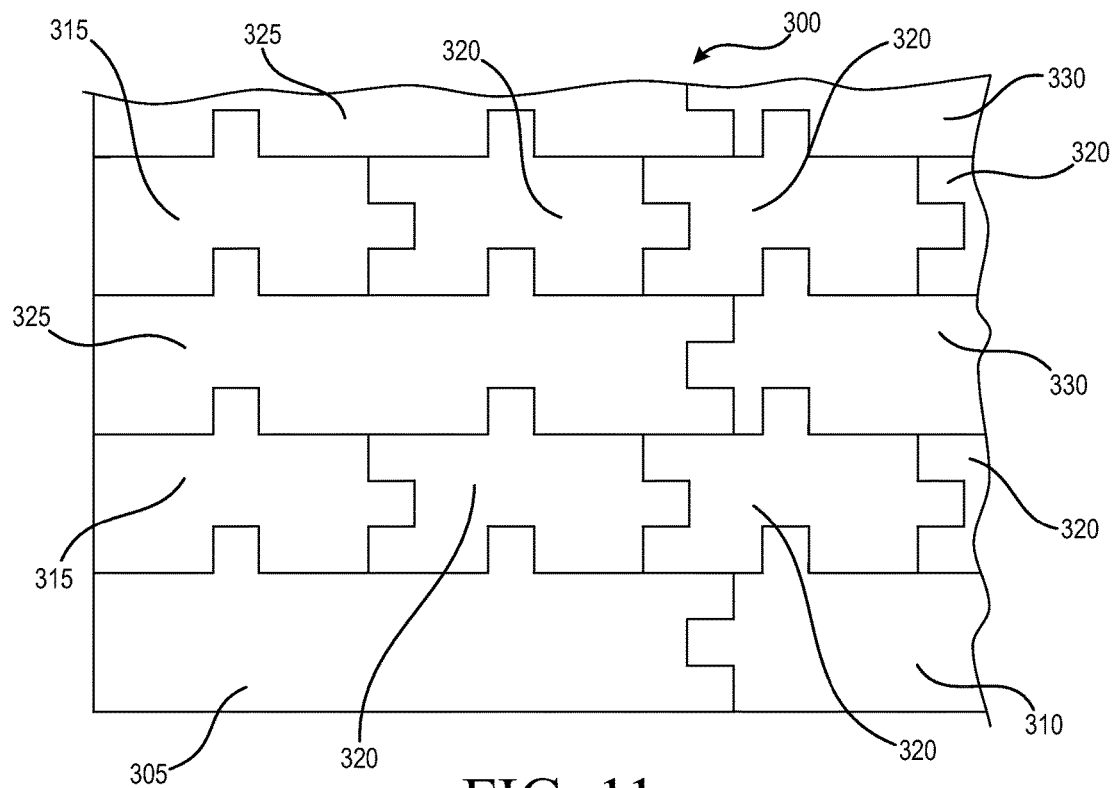
FIG. 11 is a plan view of a fifth exemplary structure.

FIG. 11 illustrates a structure 300, an alternative embodiment of the exemplary disclosed structure. Structure 300 may include a plurality of containers that may be similar to containers 15 and 20, disclosed above. For example, as illustrated in FIG. 11, structure 300 may include a container 305, a container 310, a plurality of containers 315, a plurality of containers 320, a plurality of containers 325, and a plurality of containers 330. Accordingly, structure 300 may contain a number of differently shaped containers having various shapes and having the interlocking arrangement illustrated in FIG. 11. Structure 300 may not include a fastening system. It is contemplated that any of the disclosed exemplary structures may also not include a fastening system. It is also contemplated that structure 300 may include a fastening system.

Figure 12:
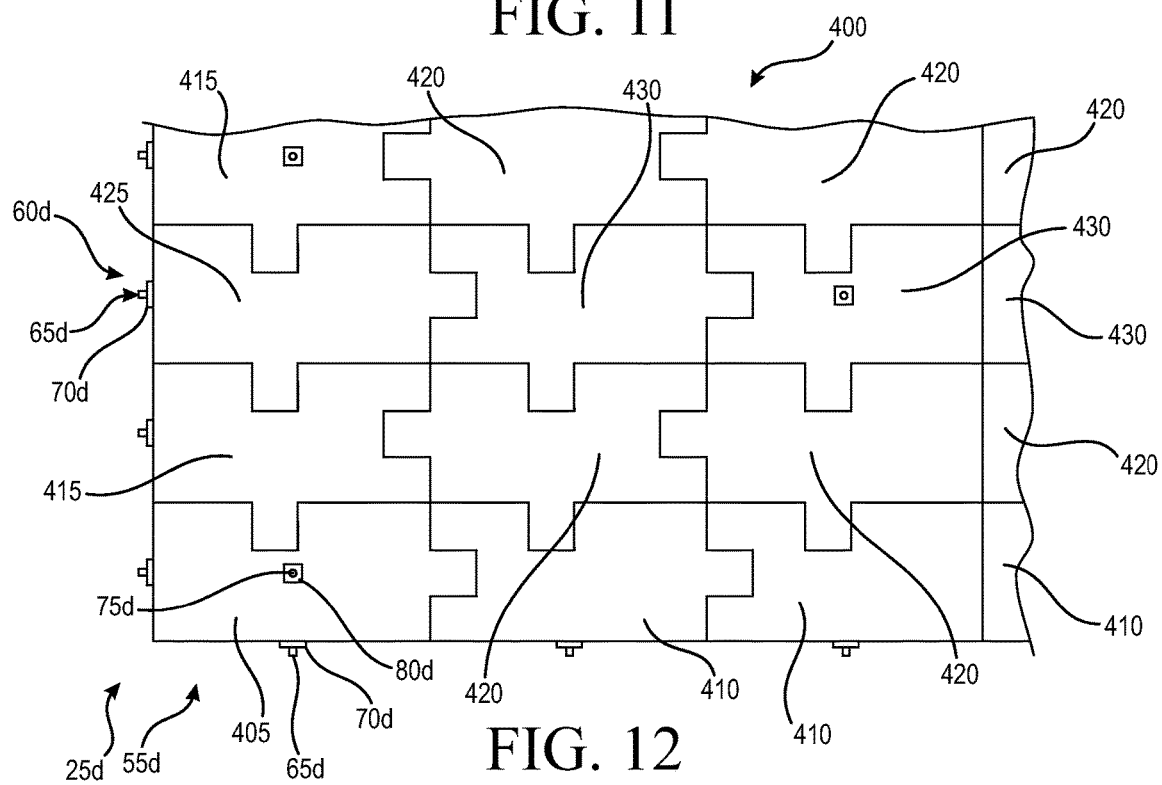
FIG. 12 is a plan view of a sixth exemplary structure.

FIG. 12 illustrates a structure 400, an alternative embodiment of the exemplary disclosed structure. Structure 400 may include a plurality of containers that may be similar to containers 15 and 20, disclosed above, and a fastening system 25d (e.g., including a horizontal fastening subsystem 55d, a vertical fastening subsystem 60d, fastening elements 65d, fastening elements 70d, fastening elements 75d, and fastening elements 80d) that is similar to fastening system 25, disclosed above. For example, as illustrated in FIG. 12, structure 400 may include a container 405, a plurality of containers 410, a plurality of containers 415, a plurality of containers 420, a container 425, and a plurality of containers 430. Accordingly, structure 400 may contain a number of differently shaped containers having various shapes and having the interlocking arrangement illustrated in FIG. 12.

Figure 13:
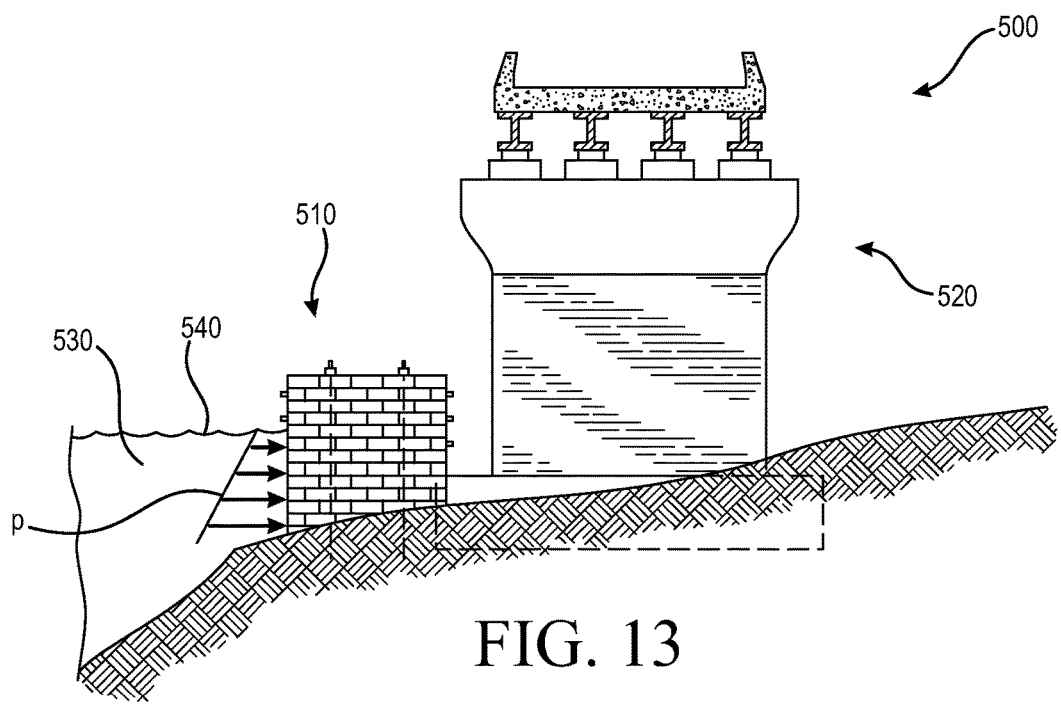
FIG. 13 is a sectional view of an exemplary erosion control system.

FIG. 13 illustrates an exemplary erosion control system 500 that may include a structure 510 that may be similar to any of the above disclosed exemplary structures. Erosion control system 500 may be, for example, a gravity retaining wall system or an erosion control system such as a riparian wall. For example, structure 510 may be a mass gravity wall. Structure 510 may be disposed near a structural system 520 such as, for example, a transportation system such as a bridge. It is also contemplated that structural system 520 may be any other suitable structure such as, for example, a commercial, residential, or military building system, a water resources structure, and/or a transportation infrastructure system such as an airport, railroad, or highway structure. Structure 510 may substantially block a flow of a water body 530 (e.g., a portion of a river, lake, ocean, and/or rainfall runoff) when, for example, a surface level 540 of water body 530 rises due to flooding and/or extreme weather.

Figure 14:
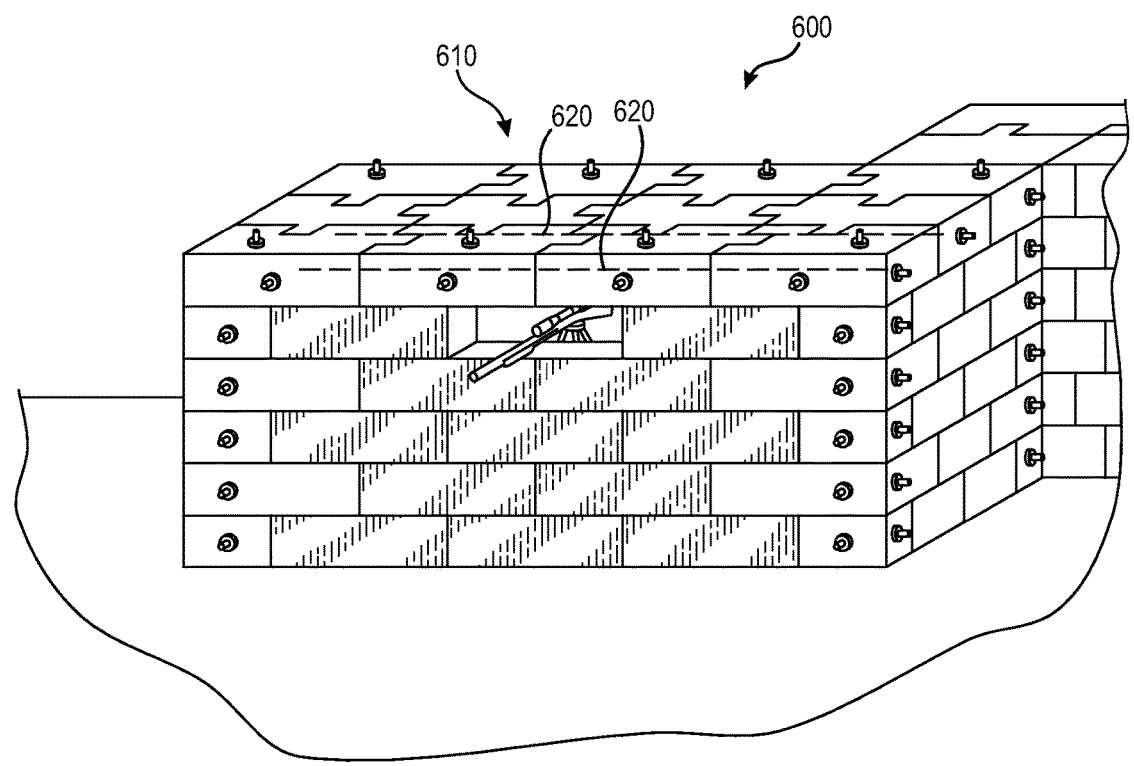
FIG. 14 is a perspective view of an exemplary military defense system.

FIG. 14 illustrates an exemplary military defense system 600 that may include a structure 610 that may be similar to any of the above disclosed exemplary structures. For example, structure 610 may be any suitable military structure such as a bunker or a part of a bunker system, a part of military earthworks, a road checkpoint, a command post, part of a perimeter defense, an observation post, or part of a defense system in an urban area. Structure 610 may include a plurality of reinforcing elements 620 that may be disposed in and/or beneath containers disposed above apertures of structure 610, thereby further reinforcing containers disposed above the apertures. Reinforcing elements 620 may be any suitable reinforcement such as, for example, metal reinforcing bars, metal reinforcement, fiber reinforcement, or elongated wooden or plastic elements. When material contained in the containers includes concrete, reinforcing elements 620 may provide reinforcement for the concrete included in the containers, thereby forming reinforced beams above apertures of structure 610.

FIG. 15 illustrates another exemplary erosion control system 700 that may include a structure 710 that may be similar to any of the above disclosed exemplary structures. As illustrated in FIG. 15, structure 710 may have a stepped arrangement including a plurality of stepped containers 720. Coatings 45, as discussed above and illustrated in FIG. 5, may facilitate forming the stepped arrangement of structure 710. For example, personnel may stack ends of containers 720 to be aligned with coatings 45 disposed on containers 720 that have already been placed, thereby forming the stepped arrangement of structure 710 as illustrated in FIG. 15. Intervals between coatings 45 may vary, based on a desired height of structure 710. Accordingly, for example, the stepping intervals (e.g., as illustrated in FIG. 5) between stepped containers 720 may vary based on a desired height of structure 710.

INDUSTRIAL APPLICABILITY

The exemplary disclosed structure may be used in any suitable construction or structural application. The exemplary disclosed structure may be used in an application such as, for example, erosion control systems, transportation and building structures, water course limitations, waterways, infrastructure, military structures, and vehicular barricades. For example, the exemplary disclosed structure may be used in erosion control systems in areas subject to flooding and in defensive military systems. Also, for example, the exemplary disclosed structure may be used in any structural application where increased lateral resistance and/or impact resistance is appropriate.

As illustrated in FIG. 4, container 15 may be fabricated as an integral container including upper part 15g, side part 15h, and lower part 15i that are integral with each other. Alternatively, upper part 15g, side part 15h, and lower part 15i may be attached together by stitching, sewing, adhesive, and/or mechanical fasteners, or some portions of upper part 15g, side part 15h, and lower part 15i may be attached together and some portions of upper part 15g, side part 15h, and lower part 15i may be integral with each other. Upper part 15g, side part 15h, and lower part 15i form cavity 15j.

As illustrated in FIG. 5, cover 35 may be removably attached by stitching, sewing, adhesion, and/or mechanical fastening to side part 15h before, during, or after a fabrication of container 15. Cover 35 substantially prevents liquid such as water from passing through side part 15h when cover 35 is attached to side part 15h.

Coating 40 is coated onto upper part 15g and/or lower part 15i before, during, or after a fabrication of container 15. Coating 45 is coated onto upper part 15g and/or lower part 15i following an application of coating 40.

Cavity 15j is partially or substantially filled with material 30 during or after a fabrication of container 15. Container 15 is closed after material 30 is disposed in cavity 15j. For example, portion 50 illustrated in FIG. 6 is closed and attached to other portions of container 15 so that material 30 is retained in container 15 when container 15 is transported.

Container 15 may be partially or fully fabricated at a location that is remote from where structure 10 is to be constructed. For example, container 15 may be partially or fully fabricated in a factory or other suitable shop. Container 15 may also be filled with material 30 at a location that is remote from where structure 10 is to be constructed. Container 15 may also be filled with material 30 at a location where structure 10 is to be constructed. For example, container 15 may be partially or fully fabricated at a location that is remote from where structure 10 is to be constructed, and then container 15 may be transported to and filled at a location where structure 10 is to be constructed. A fabrication of container 15 may also be completed and container 15 filled with material 30 at a location where structure 10 is to be constructed. Container 15 may also be substantially entirely fabricated and filled with material 30 at a location where structure 10 is to be completed. Because container 15 may be transported before being filled with material 30, transportation costs may be reduced.

After container 15 is fabricated and cover 35 is removably attached, coatings 40 and 45 are applied, and material 30 is disposed in cavity 15j, container 15 is provided as a part of structure 10. When cover 35 is attached to side part 15h, cover 35 substantially prevents a flow and/or infiltration of liquid such as water through side part 15h of container 15. When coating 40 is a nonpermeable coating, coating 40 substantially prevents a flow of liquid such as water through upper part 15g and lower part 15i of container 15. Accordingly, when cover 35 is attached to side part 15h and when coating 40 that is a nonpermeable coating is applied to upper part 15g and lower part 15i, a saturation and/or hydration of material 30 disposed in cavity 15j may be substantially prevented. Hydration and/or saturation of material 30 may thereby be substantially prevented during fabrication and/or transportation of container 15, and/or construction of structure 10. For example, when material 30 is a dry material such as dry non-mixing concrete, hydration of the dry non-mixing concrete is substantially prevented.

Containers 20 may be utilized similarly to the method described above for container 15. As described above and as illustrated in FIG. 1, a plurality of containers 15 and containers 20 are interlocked via respective protrusions 15a, protrusions 15b, recesses 15c, recesses 15d, protrusions 20a, protrusions 20b, recesses 20c, and recesses 20d. Interlocked layers of containers 15 and containers 20 are stacked on other interlocking layers of containers 15 and containers 20, as illustrated in FIGS. 1 and 2. Interlocking layers of containers 15 and containers 20 may be stacked in a staggered and/or stepped pattern using coatings 45, as described above and as illustrated in FIGS. 5 and 15.

As each container 15 and container 20 is added and interlocked into structure 10, some, most, or substantially all covers 35 are removed. It is also contemplated that some, most, or substantially all covers 35 may be left attached to containers 15 and containers 20. Covers 35 may be ripped off by construction personnel as containers 15 and containers 20 are interlocked to assemble structure 10. After covers 35 are removed from respective containers 15 and containers 20, liquid such as water is able flow into those containers 15 and containers 20 and saturate and/or hydrate material 30 disposed within those containers 15 and 20. Fluid such as water that enters cavity 15j may moisten, saturate, and/or hydrate material 30, thereby increasing a weight of material 30.

For example, when material 30 is dry non-mixing concrete, fluid such as water entering containers 15 and containers 20 initiates hydration of material 30. Combining fluid such as water with material 30 when it includes a concrete mix forms a cement paste by a process of hydration. During hydration, the cement paste both cements together and fills voids between concrete aggregate and other elements of material 30 when it includes a concrete mix. The hydration process involves numerous different chemical reactions that may occur simultaneously and/or in succession. Hydration causes the components of material 30 when it is a concrete mix to bond together to form a solid matrix. After undergoing hydration, material 30 when it is a concrete mix becomes a solid, hydrated or crystallized matrix. For example, material 30 that is a concrete mix becomes hardened concrete through hydration.

Fastening system 25 may be installed during and/or after the construction of structure 10. To assemble fastening system 25, fastening elements 65 and fastening elements 70 of horizontal fastening subsystem 55 and fastening elements 75 and fastening elements 80 of vertical fastening subsystem 60 are assembled through and onto the interlocking layers of containers 15 and containers 20 as described above and as illustrated in FIGS. 8 and 9. Construction personnel use suitable equipment such as jacks, hand tools, power tools, and automated machines to tighten and/or adjust fastening elements 65 and fastening elements 75 to pull interlocking containers 15 and 20 together tightly, thereby substantially reducing gaps and voids between adjacent containers 15 and containers 20. Structure 10 may thereby be fastened together and pinned to the earth or other material on which structure 10 is supported via fastening system 25.

Structure 10 possesses relatively increased lateral resistance against external forces. The interlocking action of respective protrusions 15a, protrusions 15b, recesses 15c, recesses 15d, protrusions 20a, protrusions 20b, recesses 20c, and recesses 20d increases lateral resistance of structure 10. For example, as illustrated in FIG. 1, Force $P_A$ applied to structure 10 causes internal forces to be developed in structure 10, which are resisted by the interlocking of respective protrusions and recesses. For example, force $P_A$ is resisted by a combination of two interlocked containers 15 via the bearing forces $P_B$ and $P_C$ developed between protrusion 15b and recess 15c. This interlocking may create a horizontal interlocking copulation, providing resistance to lateral movement. Tension and compressive forces may be developed through the positive connection between protrusions and recesses of the interlocking containers of structure 10, which causes increased transfer of forces (e.g., more efficient transfer of forces) between the interlocking containers of structure 10. The dispersion of loads throughout structure 10 is thereby increased. The staggering of containers throughout structure 10 (e.g., the staggering between seams 22 and 24 as illustrated in FIG. 1) may also increase the dispersion of forces throughout structure 10. This interlocking arrangement between the plurality of protrusions and recesses of containers 15 and containers 20 causes structure 10 to act as an integrated structure in resisting lateral external forces.

The frictional resistance (e.g., frictional force) developed between coatings 40 of stacked interlocking layers of containers 15 and containers 20 also increases lateral resistance of structure 10. Coating 40 disposed on upper part 15g of a first container 15 and coating 40 disposed on lower part 15i of a second container 15 stacked on top of first container 15 increase the frictional force between stacked interlocking layers of containers. Coating 40 thereby more effectively transfers forces between stacked layers of structure 10. This increased frictional resistance (e.g., frictional force) between stacked layers of containers 15 and containers 20 causes structure 10 to act as an integrated structure along it height in resisting lateral external forces. Additionally, the weight applied by containers stacked above any given frictional plane further increases the frictional resistance (e.g., $F_f = \mu_s * N$, where $F_f$=frictional force or frictional resistance, $\mu_s$=static friction coefficient, and N=weight of containers stacked above frictional plane; as N increases, the frictional force or frictional resistance $F_f$ increases). Therefore, as additional containers are stacked on a given container, the frictional force developed at a frictional plane associated with the given container increases.

When covers 35 are removed from containers 15 and containers 20 to allow liquid such as water to saturate and/or hydrate material 30 disposed in containers 15 and containers 20, a lateral resistance of structure 10 is increased. Saturated and/or hydrated material 30 weighs more than the same material 30 when dry. The relatively heavier saturated and/or hydrated material 30 has an increased weight and lateral resistance as compared to relatively dry material 30, thereby increasing its resistance to lateral external forces. For example, when material 30 is a concrete mix, material 30 undergoes hydration to become hardened concrete having a relatively heavy weight and high lateral resistance.

For example, when material 30 disposed in containers 15 and 20 includes the absorbing material, described above, liquid such as water is absorbed by the absorbing material when covers 35 are removed. As the absorbing material absorbs the fluid, a weight of the absorbing material increases, thereby increasing a weight of material 30. When material 30 is dry non-mixing concrete, material 30 undergoes hydration when exposed to fluid such as water entering containers 15 and containers 20 when covers 35 are removed. As fluid is absorbed into the absorbing material disposed in hydrated material 30, the weight of material 30 further increases (because a volume or size of a hydrated matrix of material 30 remains substantially constant as additional fluid is absorbed into the absorbing material). Absorbing material disposed in material 30 thereby further increases the weight of material 30 and the lateral resistance of structure 10 (e.g., as described above regarding the frictional force $F_f = \mu_s * N$, increasing the weight of material 30 will increase N, thereby increasing $F_f$, which increases the lateral resistance of structure 10 to external lateral forces). It is also contemplated that a weight of material 30 may decrease when fluid such as water evaporates from material 30 and the absorbing material disposed in material 30 dries out.

Fastening system 25 also increases the lateral resistance of structure 10. As described above, fastening system 25 pulls interlocking containers 15 and 20 together tightly, causing structure 10 to act further as an integrated structure against lateral external forces. Fastening system 25 also pins structure 10 to the earth or other material supporting structure 10 via fastening elements 75, further increasing the lateral resistance of structure 10.

Structure 10 may be reusable. After structure 10 has been constructed, fastening system 25 may be disassembled from structure 10 and removed. Containers 15 and containers 20 may be separated from their interlocking arrangement and transported from the location of structure 10. Material 30 may be emptied from containers 15 and containers 20, for example, at the location of structure 10 or at another location. For example, containers 15 and containers 20 may be bags and material 30 may be material such as sand and/or gravel that is emptied from containers 15 and containers 20. Containers 15 and containers 20 and fastening system 25 may then be stored at the same site or transported to another location, and subsequently used in a new structure 10.

Any of the exemplary structures described in the present application may be used similarly to the method described above for containers 15 and 20 of structure 10. For example, as illustrated in FIG. 13, structure 510 that is similar to structure 10 may be constructed as part of erosion control system 500 adjacent to structural system 520. If surface level 540 of water body 530 rises, it will apply a lateral external force p against structure 510. Liquid such as water from water body 530 will also flow into structure 510 having covers (e.g., similar to covers 35) that are removed. As described above for structure 10, structure 610 will possess increased lateral resistance against lateral external force p due to the above exemplary disclosed features.

The exemplary disclosed structure may have relatively high lateral resistance to external forces. The interlocking arrangement between the plurality of protrusions and recesses of the exemplary disclosed containers may cause the exemplary disclosed structure to act as an integrated structure in resisting lateral external forces. The increased frictional resistance between stacked layers of exemplary disclosed containers coated with exemplary disclosed coatings may increase resistance to lateral external forces. The exemplary disclosed structure may include exemplary disclosed covers that may be removed to allow material contained in the structure to be saturated and/or hydrated, which may increase lateral resistance to external forces. The exemplary disclosed structure may require relatively fewer containers than conventional systems to provide an appropriate amount of lateral resistance. The exemplary disclosed structure may be reusable and may be transported without fill material, reducing costs associated with using the system.

It will be apparent to those skilled in the art that various modifications and variations can be made to the disclosed structure and method for using the structure. Other embodiments will be apparent to those skilled in the art from consideration of the specification and practice of the disclosed structure and method. It is intended that the specification and examples be considered as exemplary only, with a true scope being indicated by the following claims and their equivalents.

What is claimed is:

1. A system comprising:
   a first layer of containers in a first plane;
   a second layer of containers in a second plane, the second layer of containers layered on top of the first layer of containers;
   each container comprising:
      a concave portion and a convex portion, the convex portion configured to protrude into the concave portion of an adjacent, in plane container to interlock with the adjacent container;
      a material encapsulated inside an interior of the container; and
      a side surface that is permeable to water to allow water to enter the container.

2. The system of claim 1, wherein the concave and convex portions cause the system to have a higher resistance to lateral forces applied to the system than the system would have absent the concave and convex portions.

3. The system of claim 1, wherein each container comprises a plurality of concave portions and convex portions, and each container is adapted to interlock with a plurality of adjacent containers via the plurality of concave and convex portions.

4. The system of claim 3, further comprising fastening elements that penetrate a plurality of containers in the first layer of containers and/or the second layer of containers, the fastening elements serving to further increase a resistance to forces applied to the system,
   wherein the fastening elements are selected from the group consisting of metal rods, metal cable, wire rope, steel rebar, post-tensioning steel rods, and fiber-reinforced plastic rods.

5. The system of claim 1, further comprising a third layer of containers stacked on top of the second layer of containers.

6. The system of claim 1, wherein the side surface comprises a permeable material.

7. The system of claim 1, further comprising a removable cover, at least a portion of which is non-permeable to water.

8. The system of claim 1, wherein at least a portion of the top and bottom surfaces are non-permeable to water.

9. The system of claim 1, further comprising a coating on at least one surface, the coating serving to increase a coefficient of friction between containers in the first layer and second layer.

10. The system of claim 1, wherein the containers in the second layer are staggered with respect to the containers in the first layer.

11. The system of claim 1, wherein the material disposed in the container is a granular material.

12. The system of claim 1, wherein the material disposed in the container is a cementitious mix that solidifies upon being exposed to water that enters the container through the side surface of the container.

13. A method comprising:
    stacking a second layer of containers on top of a first layer of containers, the first layer of containers being in a first plane and the second layer of containers being in a second plane;
    wherein each container comprises:
       a concave portion and a convex portion, the convex portion configured to protrude into the concave portion of an adjacent, in plane container to interlock with the adjacent container;
       a material disposed inside the container such that the material is encapsulated on every side by interior walls of the container; and
       a side surface that is permeable to water to allow water to enter the container.

14. The method of claim 13, wherein the concave and convex portions cause the system to have a higher resistance to lateral forces applied to the stacked containers than the stacked containers would have absent the concave and convex portions.

15. The method of claim 13, wherein each container comprises a plurality of concave portions and convex portions, and each container is adapted to interlock with a plurality of adjacent, in plane containers via the plurality of concave and convex portions.

16. The method of claim 13, further comprising inserting fastening elements into a plurality of containers in the first layer of containers and/or the second layer of containers, the fastening elements serving to further increase a resistance to forces applied to the stacked containers,
    wherein the fastening elements are selected from the group consisting of metal rods, metal cable, wire rope, steel rebar, post-tensioning steel rods, and fiber-reinforced plastic rods.

17. The method of claim 13, further comprising stacking a third layer of containers on top of the second row of containers, the third layer of containers being in a third plane.

18. The method of claim 13, wherein the side surface comprises a permeable material.

19. The method of claim 13, further comprising removing a cover from the containers, at least a portion of the cover being non-permeable to water.

20. The method of claim 13, wherein the containers comprise a coating on at least one surface, the coating serving to increase a coefficient of friction between containers in the first layer and the second layer.

* * * * *